United States Patent [19]

Baird et al.

[11] Patent Number: 4,954,837
[45] Date of Patent: Sep. 4, 1990

[54] TERRAIN AIDED PASSIVE RANGE ESTIMATION

[75] Inventors: Charles A. Baird; Noel Collins, both of Melbourne Beach, Fla.

[73] Assignee: Harris Corporation, Melbourne, Fla.

[21] Appl. No.: 382,197

[22] Filed: Jul. 20, 1989

[51] Int. Cl.$^5$ .......................... G01S 3/02; G01C 21/00
[52] U.S. Cl. ..................... 342/458; 364/449; 364/458
[58] Field of Search ................ 342/458, 451, 462; 364/458, 449

[56] References Cited

U.S. PATENT DOCUMENTS 4,584,646  4/1986  Chan et al. .................. 364/449
4,829,304  5/1989  Baird ........................... 342/63

OTHER PUBLICATIONS

"Design Techniques for Improved Map-Aided Navigation", by Charles A. Baird, at the 1985 National Aerospace & Electronics Conference, Dayton, Ohio, May 21-24, 1985.

Primary Examiner—Thomas H. Tarcza
Assistant Examiner—Gregory C. Issing
Attorney, Agent, or Firm—Antonelli, Terry, Stout & Kraus

[57] ABSTRACT

Stored digital terrain data are used as a parameter for a passive ranging exteded Kalman filter in a target range measurement system. The system accurately locates ground based targets using platform referenced passive sensors. The Kalman filter algorithm fuses angular target measurements (azimuth and elevation) from available sensors (FLIR, RFR, etc.) along with stored digital terrain data to obtain recursive least-square error estimates of target location. An iterative algorithm calculates the slant range to the intersection of the target's line of sight vector with the digital terrain data base. This calculated slant range is used as an input to the Kalman filter to complement the measured azimuth and elevation inputs. The Kalman filter uses the calculated range measurement to update the target location estimate as a function of terrain slope. The system arrives at a rapid solution by using the stored digital terrain data to provide estimates of range. The Kalman filter provides the framework for fusion, filtering of the measurement noise, and automatic triangulation when owncraft maneuvers improve observability. Results from a Monte Carlo simulation of the algorithm, using real terrain data, are presented. Measurement noise effects, and the more dominant terrain effects on the system estimation accuracy are analyzed.

12 Claims, 11 Drawing Sheets

FIG. 8

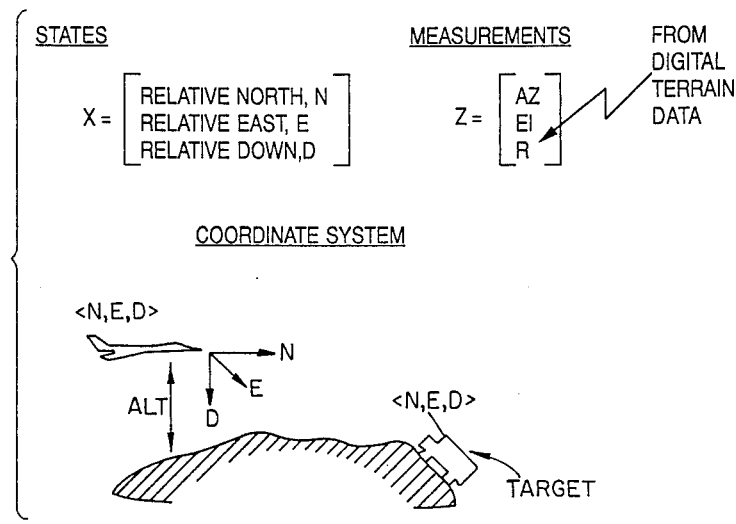

FIG. 9

```
IF    (FIRST MEASUREMENT) THEN
      DERIVE TARGET SLANT RANGE MEASUREMENT (PERFORM LOS INTERSECTION ALGORITHM)
      INITIALIZE STATE AND COVARIANCE
ELSE  (MEASUREMENT UPDATE)
      DERIVE TARGET SLANT RANGE MEASUREMENT (PERFORM LOS INTERSECTION ALGORITHM)
      TIME UPDATE PREVIOUS STATES (CORRECT FOR OWNSHIP MOVEMENT)
      CALCULATE Q MATRIX (COMPENSATE FOR PROCESS NOISE)
      TIME PROPAGATE COVARIANCE (ADD Q)
      CALCULATE H MATRIX
      CALCULATE GAIN
      CALCULATE FUNCTIONALS (ESTIMATE OF MEASUREMENTS FROM UPDATE OF STATES)
      PERFORM STATE UPDATE
      PERFORM COVARIANCE UPDATE
ENDN                  REPEAT EACH MEASUREMENT
```

FIG. 10

1. $\tilde{X} = \hat{X} + \text{OWNSHIP}$ (STATE EXTRAPOLATION)
2. $\tilde{P} = \hat{P} + Q$ (ERROR COVARIANCE EXTRAPOLATION)
3. $K = \tilde{P}H^T(H\tilde{P}H^T + R)^{-1}$ (KALMAN GAIN)
4. $\hat{P} = (I - KH)\tilde{P}$ (ERROR COVARIANCE UPDATE)
5. $\hat{X} = \tilde{X} + K(Z-F)$ (STATE UPDATE)

WHERE:
$\tilde{X}, \hat{X}$ — TIME UPDATED & MEASUREMENT UPDATED STATE VECTOR
OWNSHIP — CORRECTION FOR OWNSHIP MOVEMENT
$\tilde{P}, \hat{P}$ — TIME UPDATED & MEASUREMENT UPDATED ERROR COVARIANCE
K — KALMAN GAIN MATRIX
I — IDENTIFY MATRIX
H — MEASUREMENT TRANSFORMATION MATRIX
R — MEASUREMENT ERROR COVARIANCE MATRIX
F — FUNCTIONALS - PREDICTION OF MEASUREMENT CALCULATED FROM TIME UPDATED STATES
Q — PROCESS NOISE COVARIANCE MATRIX
Z — MEASUREMENT VECTOR
Z-F — MEASUREMENT RESIDUAL - INNOVATION
$(H\tilde{P}H^T + R)$ — MEASUREMENT RESIDUAL COVARIANCE (INNOVATION COVARIANCE)

FIG. 11

FUNCTIONALS (FEEDBACK)

$$AZ = \tan^{-1}[E/N]$$

$$EI = \tan^{-1}\left[\frac{-D}{\sqrt{N^2 + E^2}}\right]$$

$$R = \sqrt{N^2 + E^2 + D^2}$$

MEASUREMENT TRANSFORMATION MATRIX $$H = \begin{bmatrix} H_{11} & H_{12} & H_{13} \\ H_{21} & H_{22} & H_{23} \\ H_{31} & H_{32} & H_{33} \end{bmatrix} = \begin{bmatrix} \frac{\delta AZ}{\delta N} & \frac{\delta AZ}{\delta E} & \frac{\delta AZ}{\delta D} \\ \frac{\delta EL}{\delta N} & \frac{\delta EL}{\delta E} & \frac{\delta EL}{\delta D} \\ \frac{\delta R}{\delta N} & \frac{\delta R}{\delta E} & \frac{\delta R}{\delta D} \end{bmatrix}$$

PROCESS NOISE COVARIANCE $$Q = \begin{bmatrix} K_h & 0 & 0 \\ 0 & K_h & 0 \\ 0 & 0 & K_v \end{bmatrix}$$

WHERE
$K_h$ = HORIZONTAL CONSTANT
$K_v$ = VERTICAL CONSTANT

ERROR COVARIANCE $$P = \begin{bmatrix} P_{NN} & P_{NE} & P_{ND} \\ P_{NE} & P_{EE} & P_{ED} \\ P_{ND} & P_{ED} & P_{DD} \end{bmatrix}$$

MEASUREMENT ERROR COVARIANCE $$R = \begin{bmatrix} \sigma AZ^2 & 0 & \rho_1 \sigma AZ \sigma R \\ 0 & \sigma EL^2 & \rho_2 \sigma EL \sigma R \\ \rho_1 \sigma AZ \sigma R & \rho_2 \sigma EL \sigma R & \sigma R^2 \end{bmatrix}$$

WHERE
$\rho_1$ = CORRELATION COEFFICIENT (0-1) BETWEEN AZIMUTH AND SLANT RANGE ESTIMATE
$\rho_2$ = CORRELATION COEFFICIENT (0-1) BETWEEN ELEVATION AND SLANT RANGE ESTIMATE

FIG. 13a

200 MONTE CARLO RUNS

| SCENARIO PARAMETERS | STEEP SLOPE, SIDE OF MOUNTAIN<br>34°12'9"N 117°35'30"W | MEDIUM SLOPE, SIDE OF MOUNTAIN<br>35°52'30"N 117°30'0"W | GRADUAL SLOPE, SIDE OF MOUNTAIN<br>35°14'0"N 117°48'0"W | |
|---|---|---|---|---|
| SENSOR TRACKER @ 10NM<br>$\sigma EL = 1$ MRAD<br>$\sigma AZ = 1$ MRAD<br>$\sigma ALT = 5M$ } OWNCRAFT<br>$\sigma POS = 50M$<br>OWNCRAFT 3000FT ABOVE TARGET | 249 FT (.4%)<br><br>$\emptyset+\beta = 19.2°$ | 720 FT (1.2%)<br><br>$\emptyset+\beta = 13.3°$ | 712 FT (1.2%)<br><br>$\emptyset+\beta = 4.0°$ | T E R R A I N |
| HELMET MOUNTED SIGHT @ 3NM<br>$\sigma EL = 10$ MRAD<br>$\sigma AZ = 10$ MRAD<br>$\sigma ALT = 5M$ } OWNCRAFT<br>$\sigma POS = 50M$<br>OWNCRAFT 1000FT ABOVE TARGET | 491 FT (2.7%)<br><br>$\emptyset+\beta = 19.5°$ | 1185 FT (6.5%)<br><br>$\emptyset+\beta = 13.6°$ | 1878 FT (10.3%)<br><br>$\emptyset+\beta = 4.3°$ | M E A N |
| SENSOR TRACKER @ 2NM<br>$\sigma EL = 1$ MRAD<br>$\sigma AZ = 1$ MRAD<br>$\sigma ALT = 5M$ } OWNCRAFT<br>$\sigma POS = 50M$<br>OWNCRAFT 500FT ABOVE TARGET | 221 FT (1.8%)<br><br>$\emptyset+\beta = 18.7°$ | 516 FT (4.2%)<br><br>$\emptyset+\beta = 12.8°$ | 307 FT (2.5%)<br><br>$\emptyset+\beta = 3.5°$ | R A N G I N G |
| RF PRECISION DIRECTION FINDING @ 100NM<br>$\sigma EL = 0.1$ DEGREE (1.7 MRAD)<br>$\sigma AZ = 0.1$ DEGREE (1.7 MRAD)<br>$\sigma ALT = 5M$ } OWNCRAFT<br>$\sigma POS = 50M$<br>OWNCRAFT 33K ABOVE TARGET | 4155 FT (0.7%)<br><br>$\emptyset+\beta = 20.2°$ | 9858 FT (1.6%)<br><br>$\emptyset+\beta = 14.3°$ | 23060 FT (3.8%)<br><br>$\emptyset+\beta = 5.0°$ | E R R O R |
| RF PRECISION DIRECTION FINDING @ 100NM<br>$\sigma EL = 0.01$ DEGREE (.17 MRAD)<br>$\sigma AZ = 0.01$ DEGREE (.17 MRAD)<br>$\sigma ALT = 5M$ } OWNCRAFT<br>$\sigma POS = 50M$<br>OWNCRAFT 40K ABOVE TARGET | 235 FT (.04%)<br><br>$\emptyset+\beta = 20.8°$ | 899 FT (.2%)<br><br>$\emptyset+\beta = 14.9°$ | 1136 FT (.2%)<br><br>$\emptyset+\beta = 5.6°$ | |

FIG. 13b

200 MONTE CARLO RUNS

| SCENARIO PARAMETERS | DRY LAKE<br>35°43'0"N 117°20'0"W | ROUGH TERRAIN, TARGET ON PEAK, BETWEEN TWO PEAKS<br>35°37'15"N 117°11'33"W | PEAK OF HIGH MOUNTAIN, ELEVATION NOISE CAUSES INTERSECTION TO OFTEN OVERSHOOT<br>34°17'12"N 117°39'18"W | TERRAIN |
|---|---|---|---|---|
| SENSOR TRACKER @ 10NM<br>$\sigma EL$ = 1 MRAD<br>$\sigma AZ$ = 1 MRAD<br>$\sigma ALT$ = 5M } OWNCRAFT<br>$\sigma POS$ = 50M<br>OWNCRAFT 3000FT ABOVE TARGET | 1038 FT (1.7%)<br><br>$\emptyset + \beta$ = 3.2° | 548 FT (1.0%) | 338 FT (0.6%) | MEAN |
| HELMET MOUNTED SIGHT @ 3NM<br>$\sigma EL$ = 10 MRAD<br>$\sigma AZ$ = 10 MRAD<br>$\sigma ALT$ = 5M } OWNCRAFT<br>$\sigma POS$ = 50M<br>OWNCRAFT 1000FT ABOVE TARGET | 2751 FT (15.1%)<br><br>$\emptyset + \beta$ = 3.5° | 1284 FT (7.0%) | 970 FT (5.3%) | |
| SENSOR TRACKER @ 2NM<br>$\sigma EL$ = 1 MRAD<br>$\sigma AZ$ = 1 MRAD<br>$\sigma ALT$ = 5M } OWNCRAFT<br>$\sigma POS$ = 50M<br>OWNCRAFT 500FT ABOVE TARGET | 382 FT (3.1%)<br><br>$\emptyset + \beta$ = 2.7° | 510 FT (4.2%) | 293 FT (2.4%) | RANGING ERROR |
| RF PRECISION DIRECTION FINDING @ 100NM<br>$\sigma EL$ = 0.1 DEGREE (1.7 MRAD)<br>$\sigma AZ$ = 0.1 DEGREE (1.7 MRAD)<br>$\sigma ALT$ = 5M } OWNCRAFT<br>$\sigma POS$ = 50M<br>OWNCRAFT 33K ABOVE TARGET | 22680 FT (3.7%)<br><br>$\emptyset + \beta$ = 4.2° | 30035 FT (4.7%) | 20254 FT (3.3%) | |
| RF PRECISION DIRECTION FINDING @ 100NM<br>$\sigma EL$ = 0.01 DEGREE (.17 MRAD)<br>$\sigma AZ$ = 0.01 DEGREE (.17 MRAD)<br>$\sigma ALT$ = 5M } OWNCRAFT<br>$\sigma POS$ = 50M<br>OWNCRAFT 40K ABOVE TARGET | 1570 FT (.03%)<br><br>$\emptyset + \beta$ = 4.8° | 637.1 FT (.1%) | 9160 FT (1.5%) | |

PASSIVE SENSOR DESCRIPTION

| SENSOR | ANGULAR ACCURACIES $\sigma_{AZ}, \sigma_{EI}$ | RATE | TARGET DETECTION RANGE |
|---|---|---|---|
| HELMET MOUNTED SIGHT (HMS) | 10 MRAD | 10HZ | 3NM |
| IR SENSOR TRACKER SYSTEM | 1 MRAD | 10HZ | 10NM |
| RF PRECISION DIRECTION FINDING SYSTEM 1 | 0.1 DEGREE (1.7 MRAD) | 10HZ | 100NM |
| RF PRECISION DIRECTION FINDING SYSTEM 2 | 0.01 DEGREE (0.17 MRAD) | 10HZ | 100NM |

OWNCRAFT LOCATION ACCURACIES

| | | |
|---|---|---|
| ALTITUDE | 5M | (1 SIGMA) |
| POSITION | 50M | (1 SIGMA) |

DIGITAL TERRAIN DATA

POST SPACING 100M

FIG. 14

| MODULE | x | + | ÷ | TRIG | √ |
|---|---|---|---|---|---|
| STATE PROPAGATION | 8 | 11 | 1 | 1 | - |
| Q MATRIX | - | - | - | - | - |
| COVARIANCE PROPAGATION | - | 3 | - | - | - |
| H MATRIX | 6 | 2 | 8 | - | 2 |
| GAIN CALCULATION | 218 | 101 | 6 | - | 2 |
| FUNCTIONALS | 3 | 3 | - | 2 | 2 |
| STATE UPDATE | 9 | 14 | - | - | - |
| COVARIANCE UPDATE | 96 | 48 | - | - | - |
| TOTALS | 340 | 182 | 15 | 3 | 6 |

TERRAIN AIDED PASSIVE RANGE ESTIMATION

This invention was made with U.S. government support under Contract No. F-3060-2-88-C-022. The U.S. government has certain rights in this invention.

BACKGROUND OF THE INVENTION

There are many applications where it is critical for a groundbased or airborne platform to passively determine the range from its position to a ground target or threat. For defensive tactical situation assessment, ground threat locations must be known to enable threat avoidance and/or proper usage of countermeasures. For offensive close air support, the attacking aircraft must precisely know the target's location to fulfill its mission. Also, for in-flight route planning the exact threat/target location must be known. Avionic systems must derive these location estimates passively, so as to maintain the obvious tactical advantages of stealth.

In many combat situations off-board assets such as tactical links or AWACS will not be available to provide target/threat locations. When off-board assets are not available, sensor platforms have to passively locate targets/threats autonomously, using sensors such as forward looking infrared sensors, infrared sensor trackers, radio frequency precision direction finding equipment, helmet mounted sights, etc. These sensors can accurately provide azimuth and elevation angular measurements to a ground based target passively, but they do not provide a measurement of range, which is required to determine target location.

SUMMARY OF THE INVENTION

The present invention is a passive system and method by which data as to the present position (including longitude, latitude, and altitude) and attitude of a sensor platform and stored terrain data are used to calculate an estimated range from the platform to a ground-based target or threat, and the estimated range is then processed by a Kalman filter to increase the accuracy of the calculated range. In accordance with the present invention, sensory angular data, owncraft positional data (i.e., data as to the position of the sensor platform), and stored digital terrain data are fused together to derive accurate threat/target location.

The present invention does not rely on triangulation through owncraft movement to arrive at range to targets. Various methods of ranging from angle-only inputs have been developed for various applications, including sonar, moving target tracking, and emitter location. These methods include various Kalman filtering techniques in different coordinate systems, as well as the use of least squares and Moore-Penrose methods. Common to all these methods is the requirement for host platform movement over long base legs to provide usable estimation accuracy. In the present invention, the use of stored digital terrain data permits relatively instantaneous single-look estimates of range, which are then refined over time using a Kalman filter. The Kalman filter has better observability characteristics due to the availability of this pseudo-measurement of range derived from the line of sight (LOS) intersection with the stored terrain data base. Hence, through use of digital terrain data, a quicker and more stable estimate of target location is achieved.

Range estimation can be improved by processing multiple looks at a threat/target, using the motion of the platform to triangulate and using time integration of multiple measurements to filter noise, thereby improving passive target location estimation. For the Kalman filter to achieve optimum performance it is required that the input noise be uncorrelated, zero mean, and Gaussian. This assumption is not generally valid, as sensors exhibit bias from sample to sample and show a correlation over time. A Monte Carlo simulation has been used to quantify the effects of an added elevation and azimuth bias on performance of the present invention. The results show that reasonable values of bias (up to half the random noise standard deviation) do not seriously affect performance of the invention. However, for sensors where the predominant errors are fixed unknown biases, the Kalman filter may be modified, or other techniques, such as a multiple model Kalman filter scheme, may be utilized.

A more detailed discussion of Kalman filters can be found in *Applied Digital Estimation*, by The Analytical Sciences Corporation, edited by Arthur Gelb, The MIT Press.

Since the present invention was designed with the generic sensor in mind, the azimuth and elevation measurements are assumed to define a "straight" LOS vector. Obviously the validity of this assumption is sensor and spectrum dependent. For instance, RF at a long distance shows propagation bending, whereas short distance IR approximates a straight line. The invention must be adapted to model propagation effects.

The invention is described herein for the single-target environment. Various techniques are known for multi-target correlation of measurements to the targets' tracks.

BRIEF DESCRIPTION OF DRAWINGS

These and other aspects and advantages of the present invention are more apparent from the drawings, in which:

FIG. 8 is a description of Kalman filter parameters suitable for the present invention;

FIG. 9 sets forth a program design language of a Kalman filter suitable for use in the present invention;

FIG. 10 sets forth Kalman equations suitable for the present invention;

FIG. 11 sets forth covariance matrices suitable for the present invention;

FIGS. 13a and 13b set forth ranging accuracies of the present invention obtained from computer simulations of its use in various terrains;

FIG. 14 is a table setting forth sensor and scenario characteristics for Monte Carlo simulations of the ranging shown FIGS. 15-19 graphically depict experimentally derived results from computer simulations of the operation of the present invention.

DETAILED DESCRIPTION OF A PREFERRED EMBODIMENT

Figure 1:
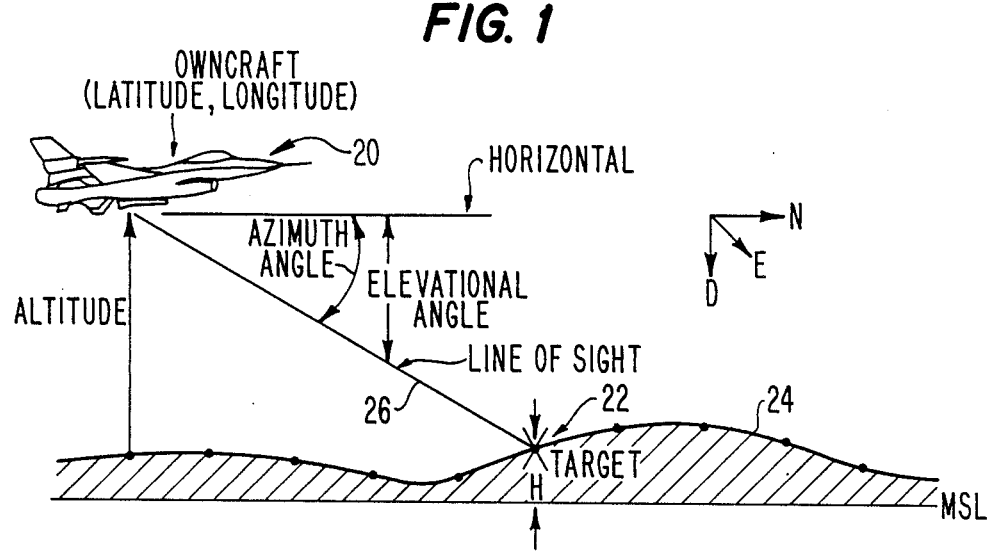
FIG. 1 is a diagram illustrating an airborne sensor platform determining the range to a ground-based target in accordance with the present invention.

FIG. 1 illustrates the problem the present invention solves. Sensors within a platform 20, such as an airplane, helicopter, tank, or other airborne or ground-based platform, passively measure angular data referenced to platform 20. The elevation angle and azimuth angle from platform 20 to a target 22 on terrain 24 are measured with respect to north and to the local horizontal. The latitude, longitude, and attitude of platform 20 are known via conventional navigational techniques, such as an inertial navigation system (INS) or a global positioning system (GPS). The altitude of platform 20 with respect to mean sea level (ms1) is likewise known via conventional techniques, such as a barometer altimeter or GPS. The height H above msl of terrain 24 at discrete points is provided in a stored digital data base within platform 20. Such data bases are available from the Defense Mapping Agency of the U.S. government. With this data, a ground intersect of the angular Line of Sight (LOS) vector 26 with terrain 24 can be determined, providing a single estimate of the range from platform 20 to target 22. Use of the terrain data avoids errors which would result using a flat terrain assumption, as can be appreciated from FIG. 1.

Figure 2:
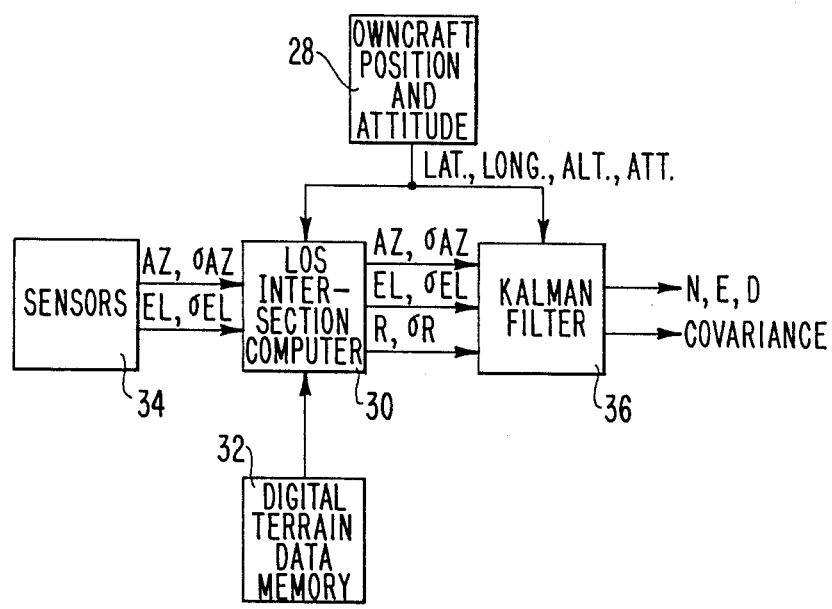
FIG. 2 is a block diagram of a system for determining the range from a sensor platform to a ground-based target in accordance with the present invention.

FIG. 2 shows an overall block diagram of the terrain aided passive range estimating system of the present invention. The navigational systems 28 on platform 20 provide indications of the platform's position, attitude, and altitude to LOS intersection computer 30 which also receives digital terrain data from memory 32. Sensors 34 on board platform 20 provide computer 30 with indications of the azimuth angle and the elevation angle from platform 20 to target 22. Computer 30 performs a LOS intersection algorithm which calculates a best estimate of the range from platform 20 to target 22, given a single azimuth angle measurement and a single elevation angle measurement from the platform to the target. This algorithm searches along the LOS vector, defined by the supplied angles until the closest terrain intersection is found. The azimuth and elevation angles define the direction of line of sight vector 26 from platform 20 to target 22, as shown in FIG. 1. This directional information is used to interrogate the terrain elevation data base in memory 32, to determine points at which vector 26 intersects terrain 24, starting from the closest possible target location to be considered out to the maximum range. When a coarse point of intersection is located, the algorithm then looks for a finer resolution intersection, using interpolation between elevation data points.

Figure 3:
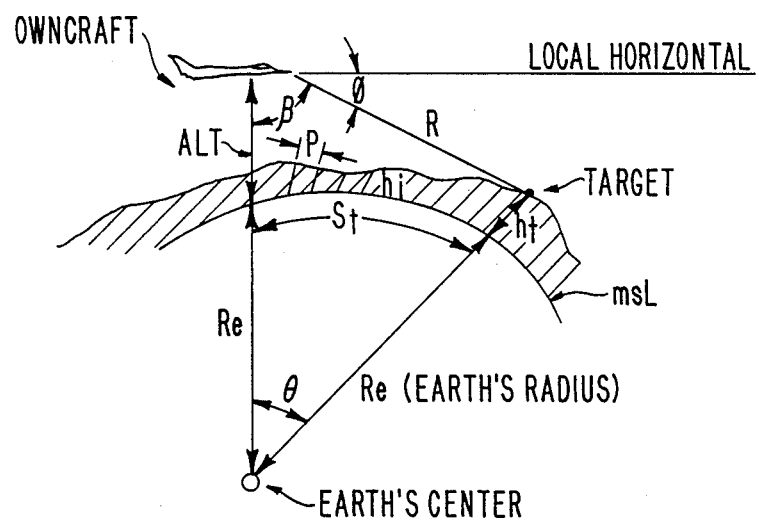
FIG. 3 is a diagram illustrating the geometry of the line of sight intersection determination problem.

FIG. 3 shows the geometry of the LOS intersection problem. If $h_t$, the target height above mean sea level, and $S_t$, the arc length distance along the earth's surface from a point vertically beneath platform 20 to the target 22, are known, then R, the target range can be calculated. An iterative method can be utilized to determine $h_t$ and $S_t$ if Alt, the ownship's altitude, $\Phi$, the elevation angle from ownship to the target, P, the terrain data post spacing, and $h_i$, the terrain height are known. From FIG. 3, the law of sines and the arc length equation permit derivation of R as a function of Re, the earth's radius, $h_t$ and $\Phi$.

From inspection of FIG. 3, the law of sines can be applied to yield:

$$[(\sin \theta)/R] = [\sin \beta]/[Re + h_t], \quad (1)$$

and it can also be seen that $$\beta = 90° - \Phi. \quad (2)$$

The arc length equation tells us:

$$S_t = Re\theta \quad (3a)$$

which can be rearranged to give:

$$\theta = S_t/R_e \quad (3b)$$

By using the trigonometric identity:

$$\cos(\alpha) = \sin(90° - \alpha) \quad (4)$$

and combining equations 1, 2, and 3b, the desired result $$R = [(Re + h_t) \sin(S_t/Re)]/\cos\Phi \quad (5)$$

is obtained as the target range. Hence, if $h_t$ and $S_t$ are known, equation 5 can be used to find R, the range.

Figure 4:
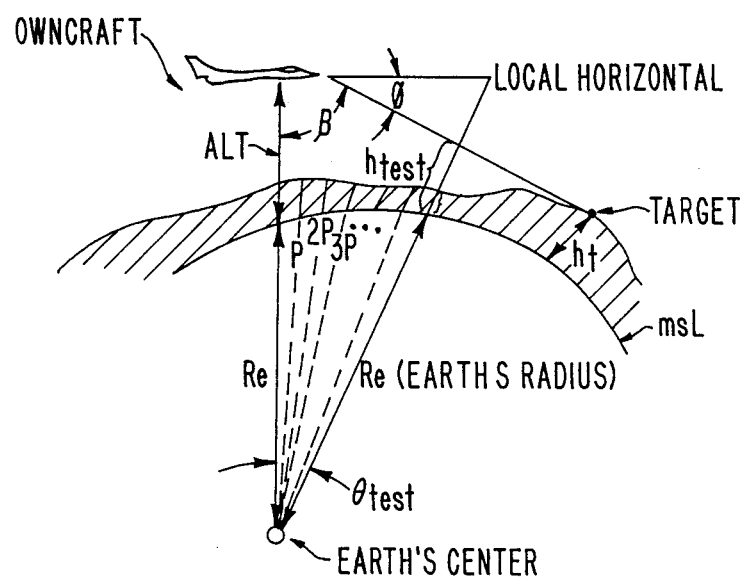
FIG. 4 is a diagram illustrating the geometry of a test solution of the line of sight intersection determination problem.

The parameters $h_t$ and $S_t$ can be found iteratively by "walking along" the earth terrain data base and comparing calculated test heights, $h_{test}$, to the data base height, $h_i$. FIG. 4 shows the geometry for the $i^{th}$ test case, which is a case before the iterative solution is found. In this case the test range is too short, and so the calculated test height, $h_{test}$, is greater than the terrain data base height, $h_i$. That is, $$h_{test} > h_i, \quad (6)$$

and so the terrain intercept is not found yet. At the actual range or terrain intercept, $h_{test} = h_i$.

The test height $h_i$ at the $i^{th}$ post can be calculated as a function of i, P, $\Phi$, and Alt, where i is the number of stored digital terrain data points between the location on the earth's surface vertically beneath the platform or owncraft and the test point, and P is the interpoint spacing. From the law of sines, $$[\sin \beta]/[h_{test} + Re] = [\sin\{180° - (\beta + \theta_{test})\}]/[Re + Alt]. \quad (7)$$

Using equations 2 and 4, equation 7 can be reduced and solved to yield:

$$h_{test} = [(Re + Alt) \cos \Phi]/[\cos(\theta_{test} - \Phi)] - Re. \quad (8)$$

The arc length equation can be used to solve for $\theta_{test}$ as a function of i and P. The arc length at the test point i, is:

$$S_{test} = i_{test}P. \quad (9)$$

The arc angle is found from:

$$S_{test} = R_e \theta_{test}, \quad (10a)$$

or:

$$\theta_{test} = S_{test}/R_e. \quad (10b)$$

Equations 8, 9, and 10 can be combined to yield:

$$h_{testi} = [(R_e + Alt) \cos \Phi]/[\cos(i_{test}P/R_e - \Phi)] - R_e \quad (11)$$

as the height of the test point. The value calculated in equation 11 is the height that should be compared to the data base height at point i to see whether the terrain intercept has been found.

$$\text{When } h_i > h_{test}, \quad (12)$$

the intercept of the line-of-sight vector and the terrain has occurred. This point is called i*.

Once point i* has been found, a finer resolution estimate of the true terrain interception can be found. A finer resolution calculation of an estimated arc distance along the earth's surface to the target $S_t$ and an estimated target terrain height $h_t$ are recalculated. The improved estimates of $S_t$ and $h_t$ are then used in equation 5 to get the desired best range estimate.

Figure 5:
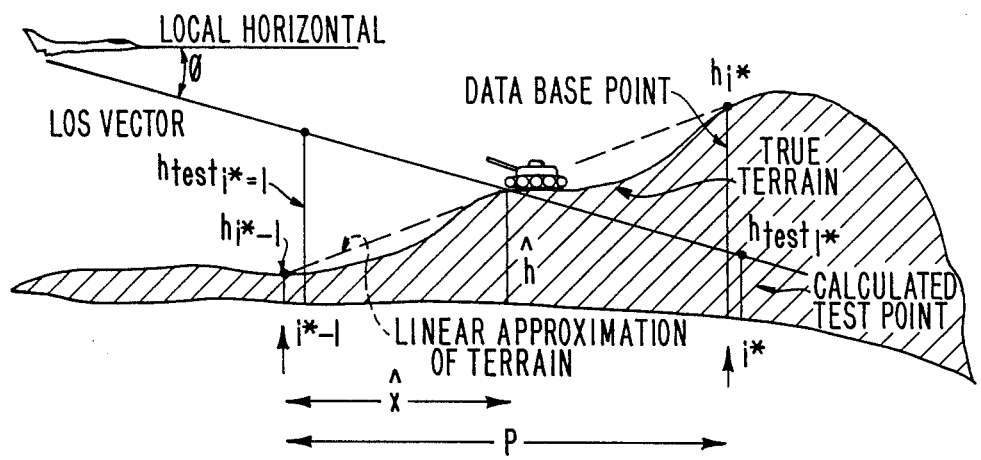
FIG. 5 is a diagram illustrating the geometry of the terrain adjacent the line of sight terrain intercept point.
Figure 6:
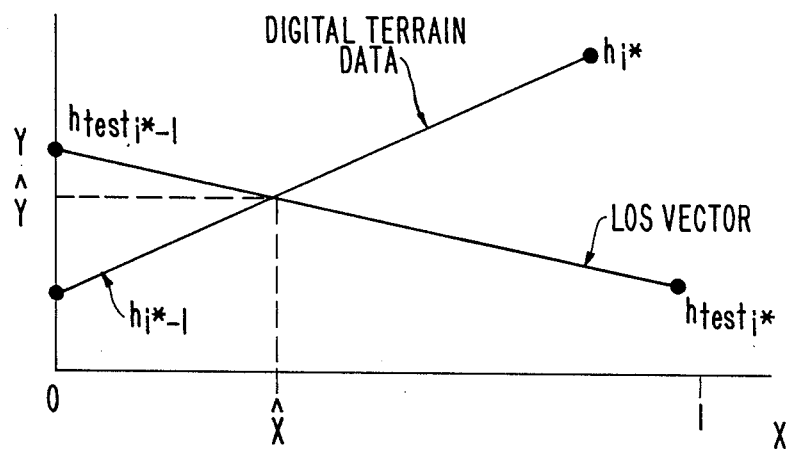
FIG. 6 is an X-Y diagram of the geometry illustrated in FIG. 5.

Between-data-point spacing estimation can be made by taking the intersection of the LOS vector and a line joining the stored terrain points before and after the target point, as shown in FIG. 5. FIG. 5 shows what parameters are desired: $\hat{h}$, the estimated target height above msl, and $\hat{X}$, the distance from the target to the previous data point i*−1. Assuming the terrain is linear between data points i* and i*−1, and assuming the effects of the earth's curvature over one post space can be neglected, FIG. 5 can be redrawn as an X-Y diagram normalized to post spacing, as in FIG. 6. Using the equation for a line, $$y = Mx + b = [(Y1 - Y0)/(X1 - X0)]X + Y \text{ intercept}, \quad (13)$$

equations for the LOS vector line and the digital terrain data line can be written as:

$$\text{LOS Vector Line: } y = (h_{testi*} - h_{testi*-1})X + h_{testi*-1} \quad (14a)$$

$$\text{Terrain Data Line: } y = (h_{i*} - h_{i*-1})X + h_{i*-1} \quad (14b)$$

Equations (14a) and (14b) have two unknowns, X and y, and so can be solved for the test point distance X as:

$$\hat{X} = [h_{i*-1} - h_{testi*-1}]/[h_{testi*} + h_{i*-1} - h_{testi*-1} - h_{i*}]. \quad (15)$$

Then, $$\hat{y} = \hat{h}_t = (h_{i*} - h_{i*-1})\hat{X} + h_{i*-1}, \quad (16)$$

where $0 < \hat{X} < 1$.

Equations 15 and 16 represent the finer resolution, best estimate of the intercept, $\hat{X}$ being the fraction of the data point spacing that the target is located from point (i*−1) and $\hat{h}_t$ being the best estimate of the target's height above mean sea level. Assuming no earth curvature over the fraction of test point spacing, $S_t$, the arc-length distance over the earth's surface that the target is located away from the ownship is best estimated as $$\hat{S}_t = (i* - 1 + \hat{X})P, \quad (17)$$

where P is the terrain data post spacing.

Now all parameters needed to calculate the best estimate of target range, using equation 5, have been derived. $S_t$ is found from equation 17, and $h_t$ is found from equation 16. $\Phi$ is the measured elevation angle, and $R_e$ is the known earth's radius. These are all used in equation 5 to compute the range, R.

Figure 7:
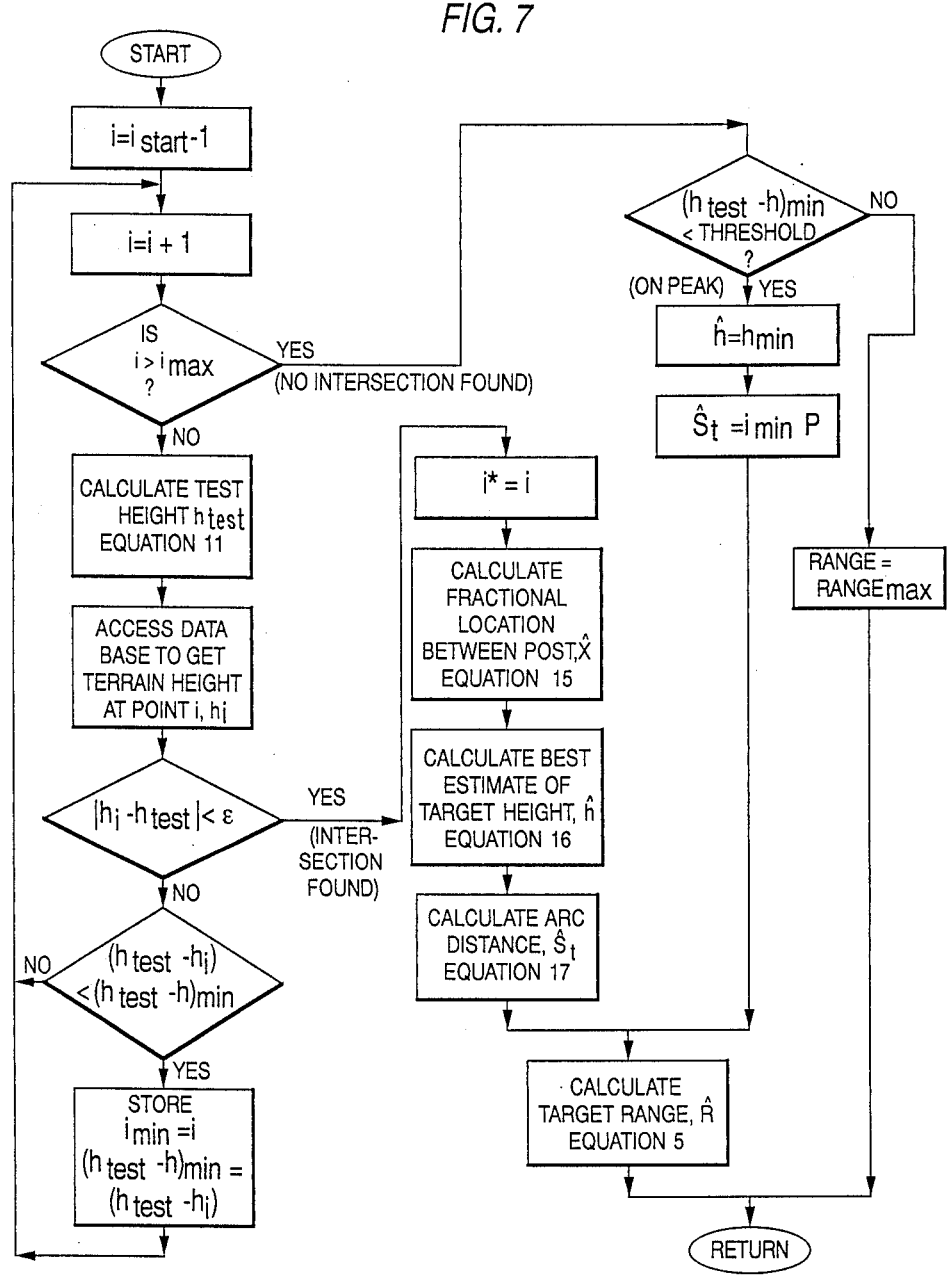
FIG. 7 is a flow chart of the line of sight intersection algorithm.

To summarize, the integer i is iterated through i=$i_{min}$ to i=$i_{max}$, using equation 11 to calculate a test target height. The calculated test target height is compared to the terrain height found from the data base at point i until the condition of equation 12 is met at point i*. Then a finer resolution solution is found using equations 15 and 16 to find a best estimate of target height and fractional distance between terrain posts. Next the arc length distance over the earth's surface to the target is calculated using equation 17. Finally, equation 5 is used to calculate the best estimate of target range. FIG. 7 summarizes the process. Additionally, FIG. 7 includes ad hoc logic to account for targets located near peaks.

The outputs from computer 30 are applied to Kalman filter 36, as depicted in FIG. 2. The Kalman filter provides outputs indicative of the length of the projection in each of three mutually perpendicular directions, i.e., north, east and down, of the line of sight from platform 20 to target 22, those lengths being designated N, E and D, respectively, in FIG. 2.

The range R is then calculated as $R = [N^2 + E^2 + D^2]^{0.5}$. The Kalman filter also provides an indication of the accuracy of its N, E and D outputs in the form of a covariance matrix.

The Kalman filter provides the general solution to the recursive, minimum mean-square error estimation problem. Use of the Kalman filter minimizes the mean-square error, provided the owncraft dynamics are known and measurement errors are accurately modeled. In addition to minimizing the mean-square error, the Kalman filter has a number of other advantages for the passive ranging problem, including the following:

1. Fusion of multiple measurements from multiple sensors can readily be accommodated. Data is not "thrown out".

2. The Kalman filter provides a convenient real time measure of the estimation accuracy through the covariance matrix.

3. The filter automatically calculates the time sequenced bearing intersection (triangulation).

4. The filter gains can easily be adapted to reflect terrain conditions.

5. All calculations are statistical in nature, no ad hoc approaches are involved.

6. Estimates are refined using terrain slope.

The present invention provides a unique application of a Kalman filter to passive ranging, in that it uses target range, found from the intersection of the LOS vector with the digital terrain data, as a measurement quantity for the Kalman filter.

The coordinate system, state vector, and measurement vector for the filter are described in FIG. 8. The filter rate is dictated by the rate at which the sensors can provide independent angular measurements. A three-state, position only Kalman filter can be used for stationary targets; however, velocity states can be added to track moving targets, using a six state Kalman filter with a constant velocity model. Maneuvering targets can be tracked using a multiple model Kalman filter scheme. The relative, North, East, Down coordinate system is chosen to facilitate triangulation and gain observability from owncraft movement. Time propagation of states (correction for owncraft movement) during periods between measurements can easily be accomplished in this coordinate system.

Figure 12:
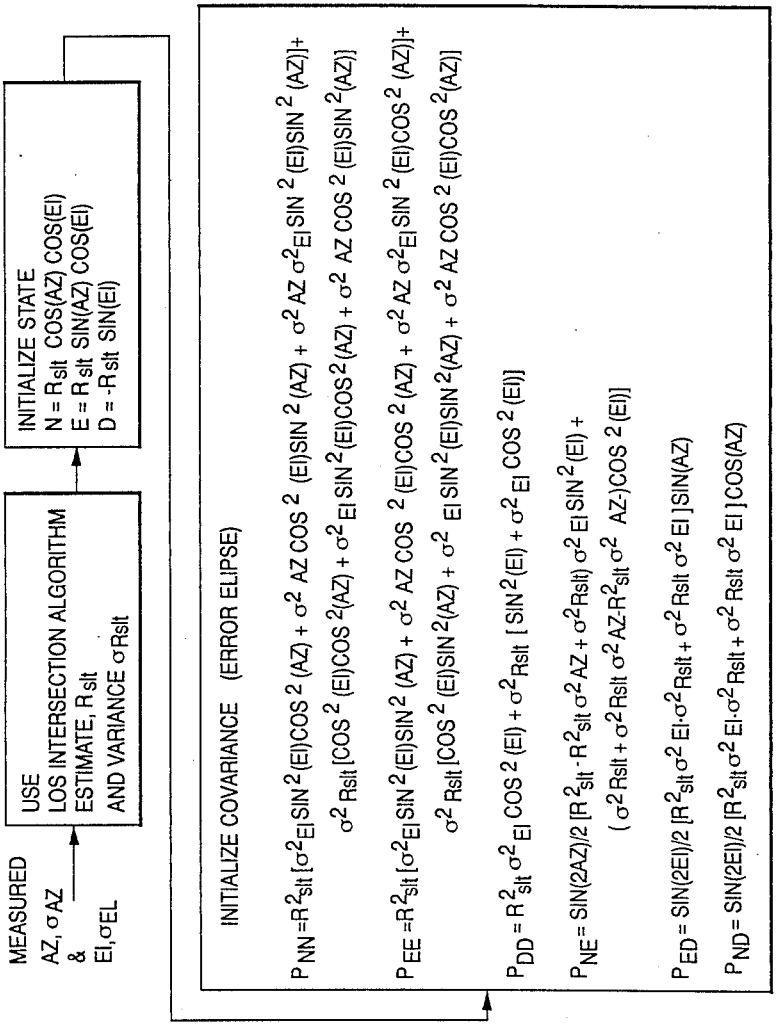
FIG. 12 sets forth initialization equations suitable for the Kalman filter in accordance with the present invention.

The program design language of a suitable Kalman filter cycle is presented in FIG. 9. The equations to initialize the state and covariance matrices and the formulas to perform much of the steady state measurement update computations are presented in FIGS. 10–12. It is to be noted in the equations that the linearization of the H matrix makes this an extended Kalman filter. This H matrix controls the gains of the filter, and similar to Kalman filter based terrain aided navigation algorithms, contains terms related to the terrain slope. Also, it should be noted that the initialization scheme, initialization being critical for proper filter convergence, is for a full covariance matrix and again takes advantage of the digital terrain data by using the LOS intersection algorithm to provide an initial estimate of range. It can also be seen from the equations that the measurement error covariance, R, includes measurement correlation coefficients, since the derived target slant range measurement will be highly correlated with the corresponding azimuth and elevation measurements.

A detailed Monte Carlo simulation of the present invention has been developed to predict performance. The Monte Carlo simulation was performed placing targets at six different locations, using five different sensor configurations. The stationary targets were placed in various terrain conditions within a terrain data base located near Edwards Air Force Base, Calif. The targets' exact latitudes and longitudes are specified in FIGS. 13a and 13b. For the following analysis, the passive ranging algorithm is assumed to receive target measurements from passive sensors which include a helmet mounted sight, IR sensor tracker, and RF precision direction finding equipment. The sensor characteristics are shown in FIG. 14. However, the algorithm utilized in the present invention is generic in nature and can readily be tuned to work with any sensors that supply target measurements of azimuth, elevation, and, if available, range.

FIGS. 13a and 13b present a matrix of ranging accuracies for the single look LOS intersection algorithm. The LOS intersection algorithm achieves these ranging accuracies through processing of one single set of azimuth and elevation measurements. The mean absolute slant range error, Er, given in FIGS. 13a and 13b, is obtained by the following formula:

$$Er = \frac{1}{N} \sum_{i=1}^{N} |R_{true} - \hat{R}_i|,$$

where $R_{true}$ is the true relative range (owncraft to target), N is the number of Monte Carlo runs (N=200), and $\hat{R}_i$ is the LOS Algorithm estimate of relative range for the $i^{th}$ Monte Carlo run. The simulation results shown in FIGS. 13a and 13b point out the effect on achievable accuracy of target location within the terrain. Ranging accuracies can vary from a few hundred feet to fifteen percent of the true range. Performing the simulation has established that the LOS intersection algorithm alone produces good results in steeper terrain, but degraded results in flat terrain for the close in IR sensor tracker and helmet mounted sight scenarios. For the longer range RF scenario, the algorithm produces good results for relatively continuous terrain, but degrades in the rougher terrain where ambiguous ranging solutions can be widely spread due to terrain effects. The present invention, with its multi-look Kalman filter processing, improves these single look results.

Figure 15:
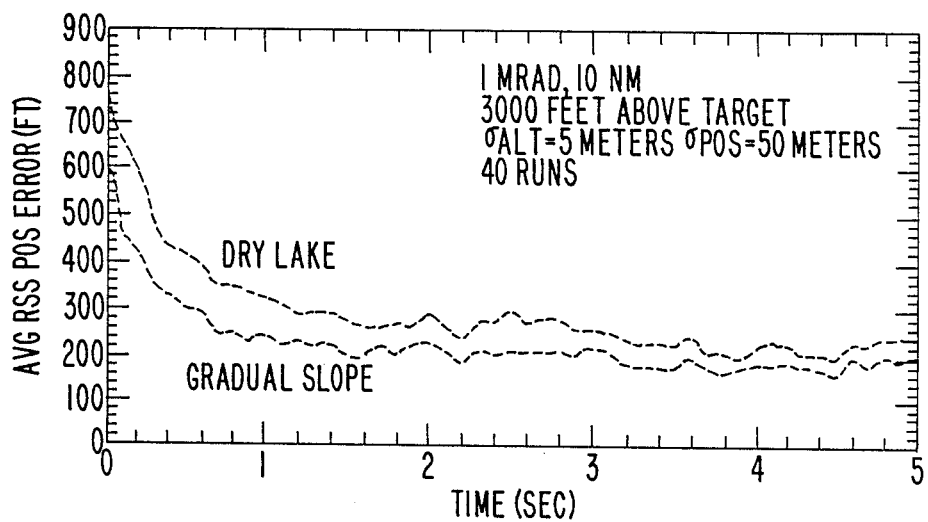
Figure 16:
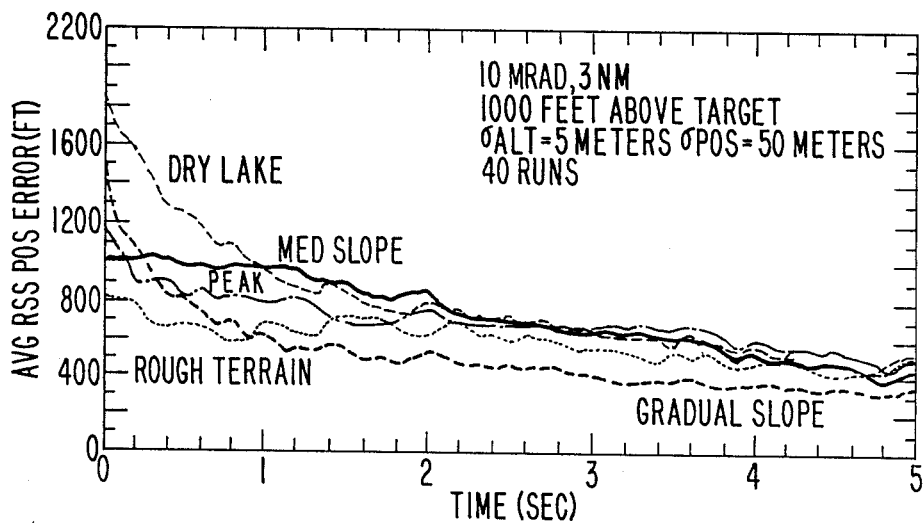

FIGS. 15 and 16 show how processing multiple sensor measurements at 10 hertz through the Kalman filter can improve estimation accuracies with sensory inputs from the IR sensor tracker and the helmet mounted sight over flat terrain. The target locations are the same as specified in FIGS. 13a and 13b for the single look LOS intersection algorithm. FIG. 15 shows that the processing of 20 measurements over a two second interval can decrease the sensor tracker's position error to approximately 250 feet of RSS error. Monte Carlo average RSS position error at a given instant of scenario time, the parameter shown in FIGS. 15 through 19, is defined by:

$$RSS = \frac{1}{N} \sum_{i=1}^{N} [(N_{true} - \hat{N}_i)^2 + (E_{true} - \hat{E}_i)^2 + (D_{true} - \hat{D}_i)^2]^{0.5}$$

where $N_{true}$, $E_{true}$, and $D_{true}$ are the true relative north, east, and down distances (owncraft to target) at given instances of time, N is the number of Monte Carlo runs (N=40), and $\hat{N}_i$, $\hat{E}_i$, and $\hat{D}_i$ are the three state Kalman filter estimates of these relative positions for the $i^{th}$ Monte Carlo run. FIG. 16 shows how the three state Kalman filter processing removes the adverse terrain effects inherent in the helmet mounted sight single look locating capability. In FIG. 16 all variations of terrain location of the target converge to relatively the same average RSS position accuracy of 400 feet due to filtering of the terrain coupled noise.

Figure 17:
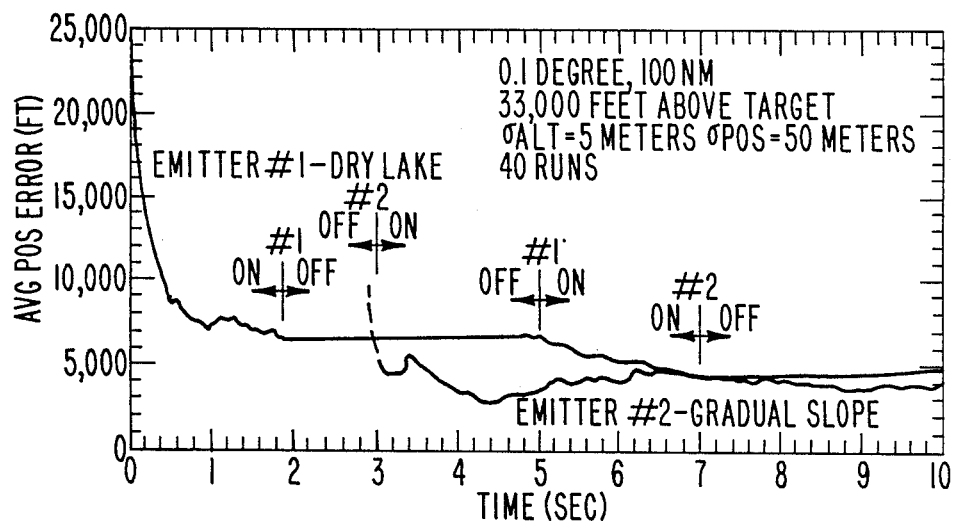
Figure 18:
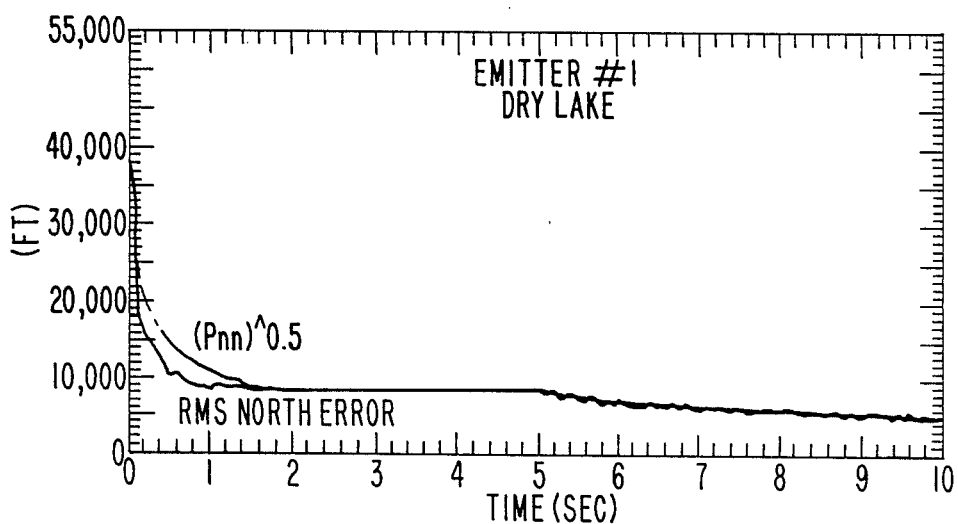

FIG. 17 shows results of 40 Monte Carlo runs using a 0.1 degree RF precision direction finding system at 100 nautical miles (nm). Emitter 1, which is on the dry lake, is turned on at time 0, turned off at 2 seconds, and turned on again at 5 seconds. Emitter 2, which is on a gradual slope, is turned on at 3 seconds and turned off at 7 seconds. For both emitters, the present invention increases single-look estimation accuracy. In the first two seconds of RF radiation detection, emitter 1's average RSS position accuracy is improved from 23000 feet to 7000 feet. This emitter's next RF burst, commencing at 5 seconds, further increases accuracy to 4000 feet at 100 nm, less than one percent of the total range. FIG. 18, for the same double emitter scenario as in FIG. 17, shows covariance matrix performance. The square root of the north-north diagonal element of the covariance matrix closely matches the actual north channel RMS error, indicating the filter is properly tuned. Not only does the present invention provide a good estimate of target/threat location, but also the covariance matrix provides a reliable indication of the estimate accuracy.

Figures 19, 20:
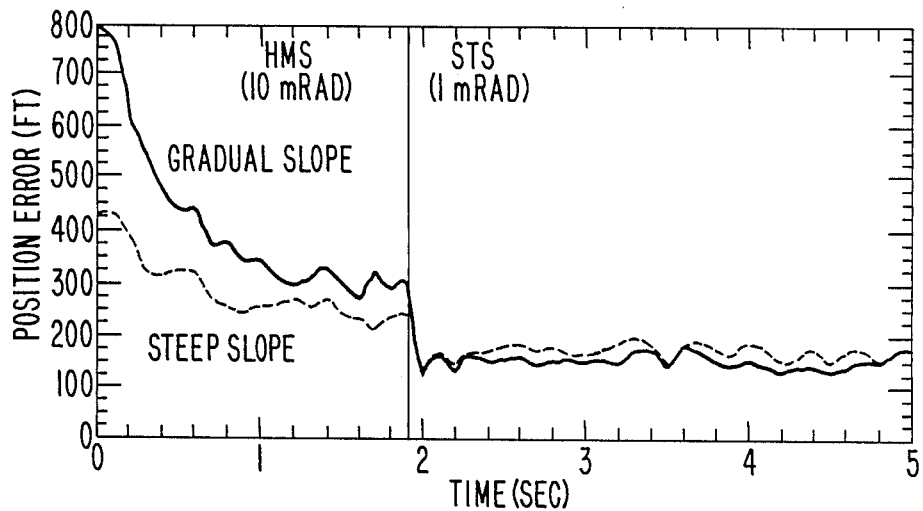
FIG. 20 sets forth the number of operations required to update a three state Kalman filter.

The following simulation results are for a target acquisition and sensor hand-off scenario and indicate how a wide angle sensor can be used for acquisition, with the target being handed off to a narrow field of view device for automated weapon delivery. This procedure overcomes the "soda straw" problem of target acquisition using a narrow field of view device. Results generated from the Monte Carlo simulation of this scenario are shown in FIG. 19. The scenario for the simulation runs is the owncraft starting at a two nautical mile range and flying directly at the target at a velocity of 300 m/s (580 knots) and a relative altitude of 2000 feet. One target is located on the side of a steeply sloped mountain, and another is located on a gradual slope of a hill. The targets are initially seen by the helmet mounted sight (10 mrad one-sigma angle errors), and two seconds later handed off to the sensor tracker system (one mrad one-sigma angle errors). Both sensors are assumed to be providing uncorrelated angle measurements at 10 hertz. The owncraft position inaccuracy is 50 meters, with a five meter error in altitude. Examination of FIG. 19 shows the immediate advantage of multi-look processing with the present invention. The filter quickly refines the position estimates from the helmet mounted sensor for both terrain cases. Then, at two seconds, the sensor tracker system data is fused to the processed helmet mounted sensor data to further improve estimation accuracy in both terrain and conditions. In this scenario there is no benefit from owncraft maneuvering, since the owncraft is flying straight to the target. With a maneuver, or a flight path somewhat tangential to the target, observability is gained and triangulation helps estimation. With a penalty to covertness, the location accuracy can be further improved by cueing a low probability of intercept burst radar or laser range finder. The cueing location would be provided by the passive location estimate of the present invention. The mechanics of the present invention provide for easy fusion of other measurement sources to pinpoint target location and release a weapon.

FIGS. 14 through 18 demonstrate estimation improvement and filter convergence using the present invention. Monte Carlo runs such as in FIGS. 14 through 18, and others, have shown promising results. FIG. 20 lists the number of mathematical operations required for a three state Kalman filter update, excluding the operations required to generate the target terrain elevation height measurement. It can be seen that the filter does not require a significant amount of computation. For a variety of scenarios and sensor characteristics, the present invention has shown improved passive target location estimation performance.

Although the present invention has been described with reference to a preferred embodiment, rearrangements and alterations can be made, and still the result would be within the scope of the invention.

What is claimed is:

1. A method of estimating the range from a sensor platform to a ground-based target, said method comprising:
   (a) acquiring navigational data indicating the platform longitude, latitude, and elevation above the earth's mean sea level;
   (b) determining the elevation angle and the azimuth angle of a line of sight from the platform to the target;
   (c) acquiring terrain data indicating the height of the earth's surface above mean sea level at each of a plurality of terrain data points in an area of terrain including the target location and the line of sight;
   (d) calculating a test target height for a test data point located on the earth's surface and on the line of sight;
   (e) comparing the calculated test target height with the height of the earth's surface at the tested terrain data point, as indicated in the terrain data;
   (f) when the calculated test target height is greater than the height of the earth's surface at the tested terrain data point, selecting another test terrain data point further from the platform than the tested terrain data point and repeating steps (d) and (e) for said another test terrain data point;
   (g) when the calculated test target height is not greater than the height of the earth's surface at the tested terrain data point, calculating an estimated range from the platform to the target; and
   (h) applying the elevation angle, the azimuth angle, and the estimated range to a Kalman filter to provide an improved estimated range from the platform to the target.

2. A method as claimed in claim 1 wherein step (g) includes determining the target location between two adjacent data points on the line of sight by calculating the point of intersection of the line of sight and a line connecting said two adjacent data points.

3. A method as claimed in claim 1 wherein step (h) includes calculating the lengths of the projections of the line of sight from the platform to the target on three mutually perpendicular axes, and calculating the square root of the sum of the squares of the calculated lengths.

4. A method as claimed in claim 3 wherein step (a) further comprises acquiring indications of the accuracy of the acquired navigational data, step (g) further comprises determining the accuracy of the calculated range, and step (h) includes determining the covariances of the calculated lengths.

5. A method of estimating the range from a sensor platform to a ground-based target, said method comprising:
   (a) acquiring navigational data indicating the platform longitude, latitude, and elevation above the earth's mean sea level;
   (b) determining the elevation angle and the azimuth angle of a line of sight from the platform to the target;
   (c) acquiring terrain data indicating the height of the earth's surface above mean sea level at each of a plurality of terrain data points in an area of terrain including the target location and the line of sight;
   (d) calculating a test target height for a test data point located on the earth's surface and on the line of sight, the calculation being based on the data point location, the navigational data, the elevation angle, and the radius of the earth;
   (e) comparing the calculated test target height with the height of the earth's surface at the tested terrain data point, as indicated in the terrain data;
   (f) when the calculated test target height is greater than the height of the earth's surface at the tested terrain data point, selecting another test terrain data point further from the platform than the tested terrain data point and repeating steps (d) and (e) for said another test terrain data point;
   (g) when the calculated test target height is not greater than the height of the earth's surface at the tested terrain data point, calculating an estimated range from the platform to the target, based on the calculated test target height, the tested terrain data point location, the determined elevation angle, and the radius of the earth; and
   (h) applying the elevation angle, the azimuth angle, and the estimated range to a Kalman filter to provide an improved estimated range from the platform to the target.

6. A method as claimed in claim 5 wherein step (g) includes determining the target location between two adjacent data points on the line of sight by calculating the point of intersection of the line of sight and a line connecting said two adjacent data points.

7. A method as claimed in claim 5 wherein step (h) includes calculating the lengths of the projections of the line of sight from the platform to the target on three mutually perpendicular axes, and calculating the square root of the sum of the squares of the calculated lengths.

8. A method as claimed in claim 7 wherein step (a) further comprises acquiring indications of the accuracy of the acquired navigational data, step (g) further comprises determining the accuracy of the calculated range, and step (h) includes determining the covariances of the calculated lengths.

9. A system for estimating the range from a sensor platform to a ground-based target, said system comprising:
  (a) a source of navigational data indicating the platform longitude, latitude, and elevation above the earth's mean sea level;
  (b) means for determining the elevation angle and the azimuth angle of a line of sight from the platform to the target;
  (c) a memory for storing terrain data indicating the height of the earth's surface above mean sea level at each of a plurality of terrain data points in an area of terrain including the target location and the line of sight;
  (d) means for calculating a test target height for a test data point located on the earth's surface and on the line of sight, the calculation being based on the data point location, the navigational data, the elevation angle, and the radius of the earth;
  (e) means for comparing the calculated test target height with the height of the earth's surface at the tested terrain data point, as indicated in the terrain data;
  (f) means responsive to the calculated test target height being greater than the height of the earth's surface at the tested terrain data point, for selecting another test terrain data point further from the platform than the tested terrain data point;
  (g) means responsive to the calculated test target height not being greater than the height of the earth's surface at the tested terrain data point, for calculating an estimated range from the platform to the target, based on the calculated test target height, the tested terrain data point location, the determined elevation angle, and the radius of the earth; and
  (h) Kalman filter means connected to receive the elevation angle, the azimuth angle, and the estimated range for providing an improved estimated range from the platform to the target.

10. A system as claimed in claim 9 further comprising means for determining the target location between two adjacent data points on the line of sight by calculating the point of intersection of the line of sight and a line connecting said two adjacent data points.

11. A system as claimed in claim 9 wherein said Kalman filter means includes means for calculating the lengths of the projections of the line of sight from the platform to the target on three mutually perpendicular axes, and means for calculating the square root of the sum of the squares of the calculated lengths.

12. A system as claimed in claim 11 further comprising means for acquiring indications of the accuracy of the acquired navigational data, means for determining the accuracy of the calculated range, and means for determining the covariances of the calculated lengths.

* * * * *